Patented June 18, 1935

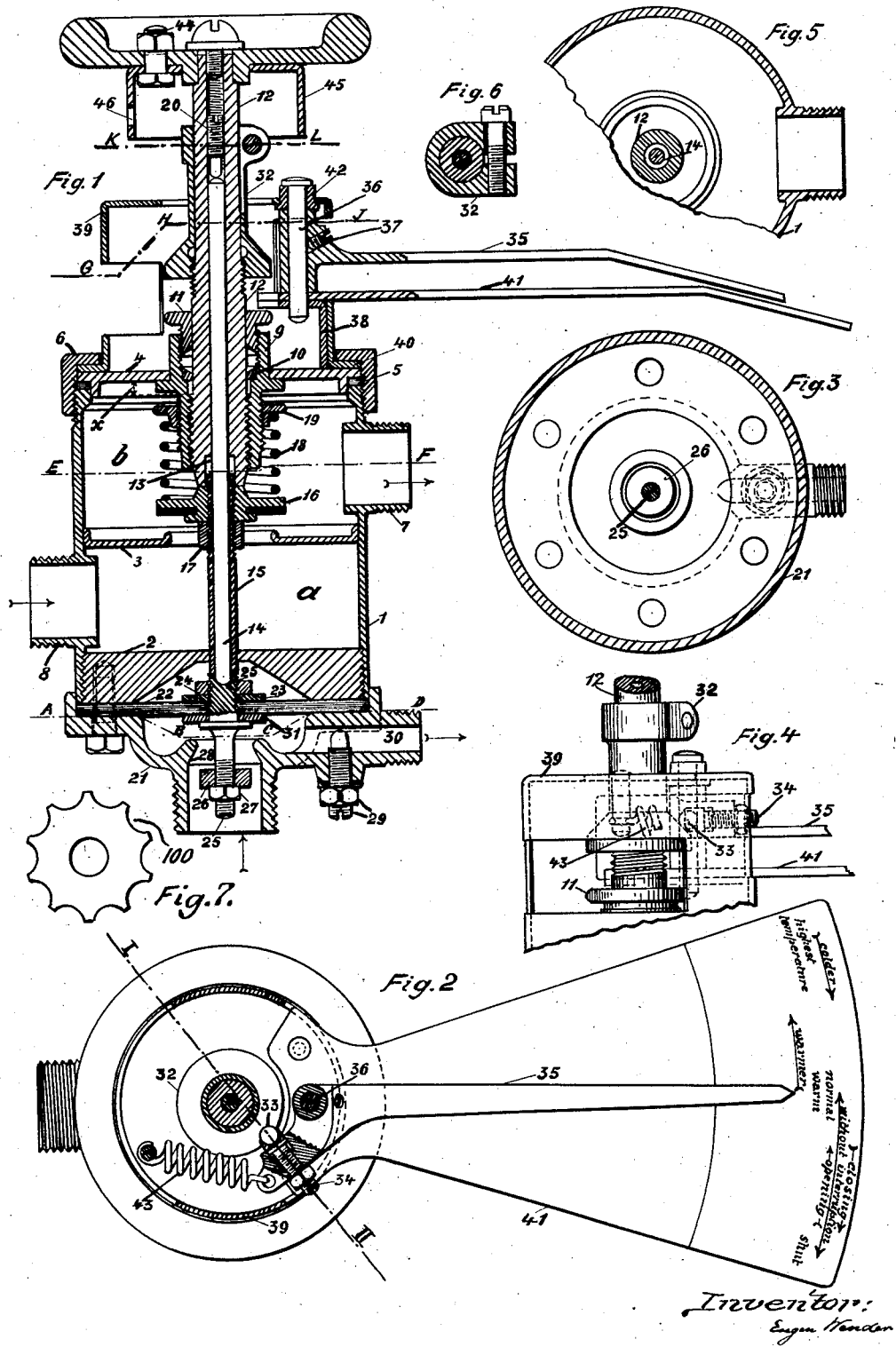

2,005,403

UNITED STATES PATENT OFFICE 2,005,403

COMBINED GAS AND LIQUID SHUT-OFF DEVICE FOR GAS HEATED LIQUID HEATERS

Eugen Wender, Sinsheim (Elsenz), Germany

Application September 28, 1931, Serial No. 565,587
In Germany October 2, 1930

6 Claims. (Cl. 236—25)

The invention refers to an improvement in control devices for the supply of gas and liquid to liquid heaters.

The well-known devices of such kind may be grouped in devices which are purely mechanically controlled and in devices in which the control takes place only by the pressure of the liquid. The disadvantages of the purely mechanically controlled devices consist in the fact that it is not possible to recognize a deficiency of water during the working of the apparatus so that in the case of deficiency of water the gas continues to burn and the apparatus will be destroyed. The disadvantage of the devices controlled only by the pressure of the liquid consists in the fact that the varying differences of pressure and the employments of the valves by the stream of water gives no surety for an unobjectionable working of the devices so that an absolutely secure closing of the gas valve does not always take place.

The essential feature of the invention in comparison with the well-known devices consists in the combination of a mechanical control both of the gas and liquid valves which are coupled to a unit, with a control of this unit by means of the liquid pressure. The closing and the release of the gas and liquid valve unit is effected by the mechanical actuated control. However, after the release of the gas and the liquid valve, the control takes place only by the pressure of the liquid without regard to the position of the mechanical control so that in the case of a deficiency of liquid pressure an automatically closing of the gas and liquid valve is effected. Therefore, the control of the valves occurs automatically. The mechanically effected closing position gives the surety that both valves are actually closed.

In the accompanying drawing which illustrates the invention, is:

Figure 1 a longitudinal section of the control device; Figure 2 a horizontal section through the line G—H—J of Figure 1; Figure 3 a similar view according to line A—B—C—D of Figure 1; Figure 4 is a partial view vertical to line I—II in Figure 2 of the indicator 35 together with its actuating cone piece 32; Figure 5 is a horizontal section through the casing according to line E—F of Figure 1; Figure 6 is a detailed horizontal section of the cone piece 32 on the line K—L of Figure 1; Figure 7 is a throttling disc with a plurality of grooves on the circumference.

The hollow casing in Figure 1 consisting of the cylinder 1 and gas-tight fitted bottom 2 is a hollow body which of course may be of one piece, provided with a cover 4, packing ring 5 and a clamping threaded ring 6 and is divided into two chambers a and b by means of the thin false bottom 3. A screwed member 9 is mounted upon the cover 4 in such a manner as to be gas-tight. The interior of this member is provided with an inside thread for the spindle 12 and with an outside thread for a pressing ring 19 for the loading spring 18, while the outwardly projecting part receives the packing bottom ring 10 and the packing gland 11. The spindle which is hollow has fitted in the usual way to its extreme end, on a square head, a hand-wheel or handle for manipulation, while the other end which is provided with a recess 13 to receive the threaded part of the tube 15 projecting over the gas valve disc 16 bears against the gas valve disc 16. One part of the stem 14 is mounted in the interior of the spindle resting at one end upon an adjusting screw 20 and at the other end upon the hemispherical pocket of a threaded part 25. This serves to transfer the axial movement of the spindle to the diaphragm 22. The diaphragm forms part of a valve for the passage of liquids and is clamped in the usual way between the bottom 2 and the lower part 21 of the casing which is provided with an inlet and an outlet for liquids, thus regulating or impeding the stoppage of the liquid i. e., regulating the movement of the liquid valve. The tubular part of the member 15, one end of which is provided with a thread engaging with the gas valve disc 16 and the jam-nut 17, is surmounted with the part of the stem 14 which projects from the spindle 12. The member 15 which passes slidingly through a guide in the bottom 2, touches, or not, the threaded part 25. One of the two valves must be arranged in such a manner that the distance between the valve members can be regulated from the outside by a simple adjustment so as to agree approximately with the distance separating the valve seats. This is effected in the present case by the screw 20 over the stem 14. The arrangement is carried out in such a manner that when the tube 15 touches the part 25, both the valves are closed. If a change in the distance of the valves demands an alteration of the valve members, then the position of the stem 14 is altered by the aid of the screw 20, so that a small distance arises between the parts 15 and 25, till the distance between the valve members corresponds with the distance of the valve seats. Upon turning the handwheel both the valve members are moved simultaneously for opening or closing the valves.

The spindle 12, as shown in Figures 1 and 4 is provided with a short and fine exterior thread above the packing gland 11 on which a cone 32 is fitted and so constructed as to be adjustable in the direction of the spindle shaft and firmly clamped. Through the medium of the tension spring 43, a ball 33 in the adjustable bolt 34 on the indicator 35 is pressed against the lower part of the cone piece 32. The indicator 35 turns about a bolt 36 arranged between the top of a drawn metal cap 39 and an angle segment 38 which is welded to the inside wall of the said drawn metal cap. The indicating dial 41 is riveted to the angle segment. The drawn metal 39 is provided in its center with an opening for the passage of the spindle 12 and cone piece 32. It is also provided with two lateral apertures for the passage of the indicator 35 and for the application of the packing gland.

In order to obtain a solid seating for the bolt 36 which is clamped by the screw 37 to the indicator 35, a bush 42 is pressed into the metal cap 39. The metal cap 39 is placed with its flanged edge 40 on the cover 4 and together with the latter is firmly and concentrically secured to the casing by the clamping threaded ring 6.

Figure 5 represents a horizontal section through the casing on the line E—F and shows the gas outlet branch 7 which, in the event of casing not being manufactured in one piece, is of course made gas-tight by brazing or welding.

Figure 6 shows the construction of the cone piece 32 which operates the indicator 35 according to the movement of the spindle 12. The lower end of this cone piece is screwed on to the spindle so that it is axially adjustable on the spindle. However, it may be rigidly connected to the spindle in its adjustable position by the clamping device.

Figure 1 represents the control device in its normal opened position. If the spindle 12 is now moved downwards i. e., turned off, taking for granted the presence of liquid, the member 15 as well as the threaded part 25 and together with it the diaphragm 22 is pressed down by the screw 20 and the stem 14 till the diaphragm finally comes to rest on the cone mouth 28 of the lower part 21 which is constructed as a seat for the liquid valve. In this manner, the flow of liquid is shut off and in consequence no liquid can enter the heater through the passage 30 past the throttling screw 29, the said heater being no longer in the position to supply liquid. During this procedure the tube 15 and with it the gas valve disc 16, has moved at the same time and in the same manner and direction as the diaphragm 22 till it also finally came to rest on its seat situated in the false bottom 3. In this final position, the gas valve is firmly pressed down and secured by the end of the spindle 12 which normally touches the valve disc 16.

The cone piece 32 in the normally opened position was previously fitted to the spindle 12 in such a manner that it brought the indicator 35 on the dial 41 to the position of "normal heat" or approximately to the centre position. As the cone piece is firmly clamped to the spindle, it advances with it in the same direction and in the same manner. In the final position of the spindle it brings the indicator 35 on the dial plate into the position of "shut" because the tension spring 43 causes the ball 33 built into the small arm of lever of the indicator 35 to follow each change of position of the cone piece 32. It is moreover also possible to adjust the indicator 35 at the completely shut position of the valve so that the dial plate 41 exactly indicates the position of "closed".

This is accomplished by the adjustable bolt 34 with its ball 33 which is constantly touching the tapered part of the cone piece 32. Owing to this, with the movement of the spindle 12, the indicator 35 constantly and automatically indicates the respective condition of the control device. The tapering of the cone piece 32 is selected in such a way that the movement of the indicator 35 and in the same way the marking on the dial plate 41 lying under the indicator corresponds to the greatest possible total spindle movement. As it is advisable in practise to turn the shut-off device which is built into a heater, to the normal position when working, that is to say, to constantly observe the regulation of "normal temperature" and "normal quantity of liquid", it is expressly indicated on the dial plate 41 that the "opening" and "closing" between "closed" and "normal heat" must always be effected without interruption.

The diaphragm 22 as part of the liquid valve, being in accordance with its object, comparatively soft and elastic, is not suitable for constant use as a valve packing. Therefore, in order to protect the diaphragm a packing disc 31 which is much harder, but at the same time elastic, is placed between the diaphragm and cone mouth 28 as a liquid valve seat. In this way, the spindle pressure transferred by the stem 14 and the threaded part 25, and coming into effect at the liquid valve seat, is not taken up by the diaphragm 22 as part of the liquid valve, but by the packing disc 31.

As previously stated, Figure 1 shows the device in a normally opened position, whereby the two valves are normally open to admit the passage of the liquid as well as the gas. In this manner the heater admits only the required quantity of liquid which is to be warmed to a normal temperature by the quantity of gas released at the same time.

It sometimes occurs in practice that the liquid is temporarily required at a higher temperature than that normally supplied by the heater. With the known construction this can only be partly and in such cases only imperfectly achieved by again turning off the liquid shut-off device which was previously open—this work being left to the attendant. The procedure is, however, not without danger to the heater, and in the present invention the above demand has been fully met in a very simple manner in that the valve spindle is easily turned on more.

If, contrary to the open normal condition as shown in Figure 1, it is desired that the heater shall supply a "warmer" liquid, the valve spindle 12—otherwise than in usual type of heaters hitherto known—is reasonably turned on more in proportion to the demand for "warmer" liquid according to the temperature required. For this purpose the spindle can be raised to an additional amount X, Figure 1, still available and in accordance with the movement of direction of the indicator pointer marked on the dial plate, towards the arrow "warmer" to the full extent marked: "highest temperature". In short, both valves are opened more than normally. In this manner the following condition is obtained.

The diaphragm 22 as part of the liquid valve raised by the increased height of the spindle 12 and the pressure of the liquid, simultaneously increases the height and the direction of the threaded part 25 and together with it, the adjustable throttling disc 26 which is secured by the jam-nut 27. The said throttling disc, situated in the cone tapering upwards and constructed as liquid valve seat, is then brought into another position reducing the annular passage for the liquid between cone wall 28 and the throttling disc 26, whereby in its turn the current of the liquid flowing into the heater through the passage 30 over the well-known throttling bolt 29 is reduced. Although the gas valve disc 16 is simultaneously raised by this procedure, the quantity of gas released thereby is not increased but remains the same as when the disc 16 is at its normal height. It thus follows that when the quantity of liquid is reduced below the normal amount it is heated to a correspondingly higher temperature by the normal supply of gas passing through the heater. In this manner when a liquid is required at a temperature above normal, it can be obtained by simply turning on the spindle 12. The condition is also clearly marked on the dial plate 41.

The action of the device is as follows: Assuming that the gas valve disc 16 rests upon the bottom 3 and that the disc 22 of the liquid valve rests upon its seat 28, the cone piece 32 is in such a position that the ball 33 brings the pointer 35 to the position of "shut". When the handwheel is turned, the liquid valve is released by the pressure of the spindle and the pressure of liquid thereupon raises the valve, allowing the passage of liquid through the device. Likewise the gas valve is raised allowing the passage of gas. When the spindle is turned in a contrary direction, the gas valve and the liquid valve are closed simultaneously.

In order to protect a heater against overheating it is well known that a minimum quantity of liquid passing through the heater per time-unit must be drawn off. In the device of the present invention, this fundamentary requirement is met with in that the throttling disc 26 when compared to the minimum diameter of the cone 28 as a liquid valve seat, is of a correspondingly smaller diameter so that the minimum quantity of liquid per time-unit can constantly pass through the remaining annular space between the cone-wall and the throttling disc even at the most disadvantageous position of the said throttling disc. Or, the throttling disc 26 being larger than the minimum clear diameter of the cone, a number of grooves 100 are provided on the circumference of the throttling disc 26 which in their totality produce a free passage, the aforementioned minimum quantity of liquid can flow through this passage and is conducted to the heater.

The normal opened position of the valves is shown in Figure 1. When the handwheel is still further turned, the opening for the passage of gas remains the same, whilst, on the contrary, the opening for the passage of liquid is throttled by the disc 26. When the pointer 35 is in the extreme position of "highest temperature", the spindle 12 is moved upwards to an additional amount $x$. The same quantity of gas then passes through the gas valve, but a reduced quantity of liquid flows through the liquid valve, so that this small quantity is heated to a higher temperature.

The device of the present invention, when closing consequent to a deficiency of liquid in the heater, works as follows:

Assuming that the supply of liquid suddenly fails during service when the spindle 12 is open, as shown in Figure 1. The hydrostatic pressure acting under the diaphragm 22 as part of the liquid valve ceases, whereupon the gas valve disc 16 which is constantly under the pressure of the spring 18, and with tube 15 resting on the threaded part 25 and diaphragm 22 moves downwards till the gas valve disc 16 comes to rest on its seat in the false bottom 3, and till the disc 31 for the protection of the diaphragm 22 comes to rest on the cone 28 terminating in a valve seat and conveying the liquid. Owing to the closure of the gas valve disc 16 the connection between the gas conveying chamber $a$ and the chamber $b$ supplying gas to the burner, is interrupted. The supply of gas to the burner ceases, whereupon the burner no longer heats the liquid and the heater is thus completely put out of service, hence destruction due to lack of liquid cannot occur. The invention therefore not only acts as a combined control device for the supply of gas and liquid, but also as a means of security against damage due to the want or failure of the supply of liquid.

Having now described in detail and established the nature of my invention, and also the manner in which the device works, I declare that what I claim is:

1. A combined gas and liquid control device for gas heated liquid heaters with mechanically controlled means for common operation and release of a liquid and a gas valve and with a casing divided into a gas chamber and a liquid chamber, comprising a liquid valve provided with throttling means and influenced by the liquid pressure, a spring which loads the gas valve and loosely connects the gas valve with the liquid valve by said pressure.

2. A combined gas and liquid control device for gas heated liquid heaters with mechanically controlled means for common operation and release of a liquid and a gas valve and with a casing divided into a gas chamber and a liquid chamber, comprising a liquid valve provided with throttling means and influenced by the liquid pressure, a spring which loads the gas valve and loosely connects the gas valve with the liquid valve by said pressure and adjustably arranged on a tube acting on the liquid valve.

3. A combined gas and liquid control device for gas heated liquid heaters with mechanically controlled means for common operation and release of a liquid and a gas valve and with a casing divided into a gas chamber and a liquid chamber, comprising a liquid valve provided with throttling means and influenced by the liquid pressure, a spring which loads the gas valve and loosely connects the gas valve with the liquid valve by said pressure, said gas valve resting under the influence of the pressure of the spring of the gas valve on an adjustable false bottom dividing the gas chamber into two compartments.

4. A combined gas and liquid control device for gas heated liquid heaters with a casing divided in a gas chamber and a liquid chamber, comprising a liquid valve with throttling means, the said throttling means consisting of an adjustable throttling disc moveable in an axial direction in a conically shaped liquid inlet, the disc having a smaller diameter than the liquid inlet, a spring which loads the gas valve and loosely connects the gas valve with the liquid valve by said pressure, mechanically controlled means for common operation and release of the liquid and gas valves, and means for indicating the position of the said valves.

5. A combined gas and liquid control device for liquid heaters with a casing divided in a gas chamber and a liquid chamber, comprising a liquid valve with throttling means, the said throttling means consisting of an adjustable throttling disc moveable in an axial direction in a conical shaped liquid inlet, the diameter of the throttling disc being larger, at least equal, to the diameter of the conical inlet, and being provided with a plurality of grooves on the circumference, a spring which loads the gas valve and loosely connects the gas valve with the liquid valve by said pressure, mechanically controlled means for common operation and release of the liquid and gas valves, and means for indicating the position of the said valves.

6. A combined gas and liquid control device for gas heated liquid heaters with a casing divided in a gas chamber and a liquid chamber, comprising a liquid valve provided with throttling means and influenced by the liquid pressure, a spring which loads the gas valve and loosely connects the gas valve with the liquid valve by said pressure, mechanically controlled means for common operation and release of the liquid and gas valves, said means consisting of a spindle, screwable in the casing and acting on the gas valve, and an adjustable stem guided within the said spindle and acting on the liquid valve, and means for indicating the position of the valves, said means consisting of a dial plate connected to the casing and a pointer movably arranged above said disc, the said pointer having a short lever arm held by a spring and carrying a ball adjusted by a screw and adapted to rest against the surface of a cone adjustably connected to the spindle of the gas valve.

EUGEN WENDER.